United States Patent [19]

Namiki et al.

[11] Patent Number: 5,452,604
[45] Date of Patent: Sep. 26, 1995

[54] MISFIRE DETECTION METHOD BASED ON FLUCTUATION IN CRANKSHAFT ROTATION

[75] Inventors: Koichi Namiki; Takuya Matsumoto; Toru Hashimoto, all of Kyoto; Yasuhisa Yoshida, Okazaki, all of Japan

[73] Assignee: Mitsubishi Jidosha Kogyo Kabushiki Kaisha, Tokyo, Japan

[21] Appl. No.: 190,541

[22] Filed: Feb. 2, 1994

[30] Foreign Application Priority Data

Feb. 5, 1993 [JP] Japan ..................... 5-018537

[51] Int. Cl.$^6$ ..................... G01M 15/00; G01P 15/00
[52] U.S. Cl. ..................... 73/116; 73/117.3; 123/419; 123/436; 364/431.08
[58] Field of Search ..................... 73/116, 117.3; 123/419, 436; 364/431.07, 431.08

[56] References Cited

U.S. PATENT DOCUMENTS

| | | | |
|---|---|---|---|
| 4,413,508 | 11/1983 | Kawamura et al. | 73/116 |
| 5,237,504 | 8/1993 | Holmes et al. | 364/431.08 |
| 5,245,865 | 9/1993 | Kayanuma . | |
| 5,307,670 | 5/1994 | Imai et al. | 73/117.3 |
| 5,331,848 | 7/1994 | Nakagawa et al. | 73/116 |

*Primary Examiner*—Richard E. Chilcot, Jr.
*Assistant Examiner*—Eric S. McCall

[57] ABSTRACT

A misfire detection method based on fluctuation in crankshaft rotation, in which a time interval required for the crankshaft to rotate over an angle region associated with a cylinder checked for misfire is detected in response to pulses supplied from a crank angle sensor having vanes. Next, a deviation of the crankshaft angular acceleration $D\omega_n$, calculated based on the thus detected time interval and corresponding to the cylinder checked for misfire, from the angular acceleration $D\omega_{n-3}$, corresponding to a cylinder belonging to the cylinder group to which the cylinder checked for misfire belongs, is compared with a determination value, and an occurrence/absence of misfire is detected in accordance with a result of the comparison. By using the deviation between the angular acceleration values calculated based on the time intervals detected through the use of the same vane, the bad effect of structural errors of the vanes is canceled, to thereby prevent erroneous misfire detection caused by the vane errors.

20 Claims, 8 Drawing Sheets

5,452,604

MISFIRE DETECTION METHOD BASED ON FLUCTUATION IN CRANKSHAFT ROTATION

BACKGROUND OF THE INVENTION

The present invention relates to a method for detecting misfire based on fluctuation in crankshaft rotation.

If a misfire condition, in which combustion in a cylinder is not performed properly, occurs in the operation of an internal combustion engine due to the failure of fuel injector or the like, the exhaust gas characteristic or the like of the engine is deteriorated. To obviate this, the information corresponding to the number of revolutions or rotation speed is calculated on the basis of the period of each predetermined crank angle corresponding to each cylinder of an engine, and the misfire condition of engine is detected on the basis of the change amount or change rate of this information, as disclosed in Japanese Unexamined Patent Publication No. H2-49955, etc. According to this Patent Publication, if misfire is detected on the basis of the deviation of the rotational angular velocity of the internal combustion engine from the rotational angular velocity before one firing as the reference angular velocity, that is, the rotational fluctuation, which is calculated for each firing interval in synchronization with the combustion stroke in the engine, misfire cannot be detected exactly when random misfire occurs or when misfire occurs approximately once for several revolutions. In Japanese Unexamined Patent Publication No. H2-49-955, therefore, the reference angular velocity is renewed as necessary.

As described above, the period of the predetermined crank angle is detected by using a crank angle sensor. The crank angle sensor typically includes a rotary member (rotor) which has a plurality of vanes or protrusions disposed at equal angular intervals and which is mounted to the crankshaft for rotation in unison therewith, and a detecting portion which is disposed to face the rotary member for detecting the passage of the vane. These vanes of the rotary member protrude in the radial direction at the periphery of the rotary member. The number of vanes corresponds to the number of engine cylinders; for example, the crank angle sensor for a 6-cylinder engine has three vanes. With the crank angle sensor of such a construction, when the end of one of adjacent vanes passes through the detecting portion as the engine rotates, the entering of crankshaft into the crankshaft rotational angle region corresponding to that vane is detected, and when the end of the other vane passes through the detecting portion, the leaving of crankshaft from that region is detected. Thus, the time interval from the time of entering the angle region to the time of leaving the region, that is, the period is detected. Further, the crankshaft rotational speed at the crankshaft rotational angle region is calculated on the basis of the detected period. Then, a determination as to whether misfire occurs is made based on the magnitude of the change in rotational speed.

In such a misfire detection method, the accuracy in detecting the period, that is, the accuracy in detecting misfire depends on the vane angle interval at the crank angle sensor, that is, the length in the vane circumferential direction. Nevertheless, an error in the construction of crank angle sensor, particularly an error in manufacturing and installing the vane, is inevitable, so that variations are produced in the vane angle intervals, thereby the accuracy in detecting misfire being decreased. When the vane angle interval is larger than the design value, the crankshaft rotation at this angle region requires much time. Therefore, it is sometimes judged by mistake that the crankshaft rotational speed has decreased at that angle region, so that the occurrence of mistakenly detected misfire.

More specifically, in the case that the angular acceleration of the crankshaft of a 2-cylinder engine is calculated based on a time interval detected by use of a crank angle sensor having no manufacturing and installing errors, both calculated angular acceleration values corresponding to two cylinders are substantially equal to zero, as shown in FIG. 1, provided that no misfire occurs in the engine and the crankshaft rotates at a constant speed. On the other hand, as shown in FIG. 2, a fluctuation appears in the angular acceleration calculated on the basis of a time interval detected by means of an ordinary crank angle sensor having errors in manufacturing and installing vanes, even if the engine is in a constant speed operation. That is, the calculated angular acceleration associated with one of the cylinders which corresponds to a crankshaft rotational angle region where a vane angle interval is too small has a positive value, whereas the angular acceleration associated with the other cylinder corresponding to another crankshaft rotational angle region where the vane angle interval is too large has a negative value. If the vane angle interval is considerably large, the calculated angular acceleration becomes less than a misfire determination level, as shown in FIG. 2, resulting in an erroneous determination of occurrence of misfire even when actual misfire does not occur.

In the case of calculating the crank angle acceleration based on the time interval detected by means of a crank angle sensor free from vane errors, the calculated angle acceleration, corresponding to a cylinder where misfire occurs, becomes less than a misfire determination level, as shown in FIG. 3, so that occurrence of misfire can be detected accurately. On the other hand, in the case of using a crank angle sensor which has vane errors, occurrence of misfire cannot be detected when the misfire occurs in a crankshaft rotational angle region where the vane angle interval is too small, since the calculated angular acceleration corresponding to the cylinder where the misfire occurs becomes larger than the misfire determination level, as shown in FIG. 4.

The above-mentioned mistaken detection cannot be eliminated by, e.g., the technology of renewing the reference angular velocity which is disclosed in . Japanese Unexamined Patent Publication No. H2-49955.

SUMMARY OF THE INVENTION

An object of the present invention is to provide a misfire detection method based on fluctuation in crankshaft rotation in which an occurrence/absence of misfire can be detected exactly by eliminating the effect of detection error, caused by the error in the construction of a crank angle sensor (more generally, detection elements), in detecting the fluctuation in crankshaft rotation.

According to the present invention, there is provided a misfire detection method for determining an occurrence/absence of misfire in an engine having a plurality of cylinders based on pieces of rotational information of a rotor which is disposed for rotation in synchronism with a crankshaft of the engine, the pieces of rotational information of the rotor being detected by use of a plurality of detection elements to be detected which are mounted to the rotor at angular intervals.

The misfire detection method comprises the steps of: (a)

repeatedly detecting rotational acceleration information of the crankshaft in a time period between predetermined crank angles, corresponding to at least one particular cylinder among the plurality of cylinders, by use of only at least one particular detection element, among the plurality of detection elements, which is disposed in a predetermined rotational angle region of the rotor; (b) sequentially outputting results of the repeated detection; and (c) performing first misfire determination for determining an occurrence/absence of misfire in the at least one particular cylinder based on the thus sequentially output results of the repeated detection.

Preferably, the step (a) includes the sub-steps of: (a1) repeatedly detecting a time interval required for the at least one particular detection element to pass through a predetermined rotational position; and (a2) repeatedly detecting crankshaft rotational acceleration information associated with the at least one particular cylinder based on the repeatedly detected time intervals.

The at least one particular cylinder consists of, for example, at least two cylinders receiving pistons which are simultaneously positioned at their upper dead center positions. In this case, the misfire detection method includes the step (d) of discriminating a predetermined cylinder among the plurality of cylinders by use of a cylinder discrimination means, and a cylinder in which misfire occurs among the at least two cylinders as the at least one particular cylinder is identified based on a result of the discrimination performed by the cylinder discrimination means when it is determined that misfire occurs in the at least one particular cylinder.

Preferably, the misfire detection method includes the steps of: (e) repeatedly detecting crankshaft rotational acceleration information in a time period between crank angles, corresponding to each of cylinder groups, by use of only at least one detection element which is disposed in a rotor rotational angle region corresponding to each cylinder group, the cylinder groups each consisting of cylinders, which receive pistons simultaneously positioned at their upper dead center positions, among the plurality of cylinders; and (f) determining an occurrence/absence of misfire in each cylinder group based on pieces of the crankshaft rotational acceleration information repeatedly detected.

More preferably, the misfire detection method includes the steps of: (g) repeatedly calculating a correction factor for compensating a structural error of the at least one particular detection element based on a corresponding one or ones of the pieces of rotational information of the rotor, to thereby carry out learning of the correction factor; (h) detecting a corresponding one or ones of pieces of crankshaft rotational information in time periods between crank angles, respectively corresponding to the plurality of cylinders, by use of a corresponding one or ones, including the at least one particular detection element, of the plurality of detection elements after said step (g) is completed; and (i) performing second misfire determination for determining an occurrence/absence of misfire in the at least one particular cylinder based on the correction factor and the corresponding one or ones of the pieces of crankshaft rotational information.

Preferably, before completion of learning the correction factor, the first misfire determination is carried out.

The present invention is advantageous in that the detection error caused by errors in the construction of the detection element concerned can be eliminated by determining an occurrence/absence of misfire in the at least one particular cylinder based on the pieces of crankshaft rotational acceleration information corresponding to the particular cylinder, the information being repeatedly detected by use of only at least one particular detection element among the plurality of detection elements mounted to the rotor disposed for rotation in synchronism with the crankshaft, whereby the occurrence/absence of misfire can be detected accurately. The reason for this is that the usage of the pieces of crankshaft rotational acceleration information respectively detected by means of only the at least one particular detection element common thereto makes it possible to mutually cancel errors contained in the pieces of crankshaft rotational acceleration information, which are caused by the structural error of the detection element. In other words, the misfire determination can be carried out based on the crankshaft rotational acceleration information which is free from errors.

According to a preferred embodiment in which the crankshaft rotational acceleration information is detected based on the time interval required for the at least one particular detection element to pass through the predetermined rotational position, the crankshaft rotational information properly reflects crankshaft rotation, and hence accurate misfire determination can be achieved.

According to the present invention, even if the at least one particular cylinder consists of two or more cylinders, it is possible to identify a cylinder in which misfire occurs among these two or more cylinders by use of the cylinder discriminating means. In other words, this makes it possible to determine an occurrence/absence of misfire in each of the cylinders of the engine.

According to the present invention, moreover, an occurrence/absence of misfire in a cylinder group consisting of cylinders each receiving an associated one of pistons which are simultaneously positioned at their upper dead center positions can be determined accurately. Thus, the method of the present invention is suitably applicable to misfire determination for a typical multi-cylinder engine provided with a plurality of cylinder groups.

According to a preferred embodiment in which the learning of the correction factor for compensating an error in the construction of the at least one particular detection element is made, and, after completion of the learning, the second misfire detection based on the correction factor and the crankshaft rotational information is carried out in place of the first misfire detection, it is possible to perform the misfire detection with an excellent follow-up characteristic relative to changes of the engine operating condition, by utilizing newer crankshaft rotational information, after a convergence degree of the correction factor reaches a desired one. Further, according to a preferred embodiment wherein the first misfire determination is carried out, while prohibiting the second misfire determination, before completion of the learning, an occurrence/absence of misfire can be determined, while preventing erroneous detection caused by utilization of an inappropriate correction factor at a stage where a desired convergence degree of correction factor is not reached.

These and other objects and advantages will become more readily apparent from an understanding of the preferred embodiments described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which.

DETAILED DESCRIPTION

A misfire detection method based on fluctuation in crankshaft rotation according to a first embodiment of the present invention will be explained.

Figure 7:
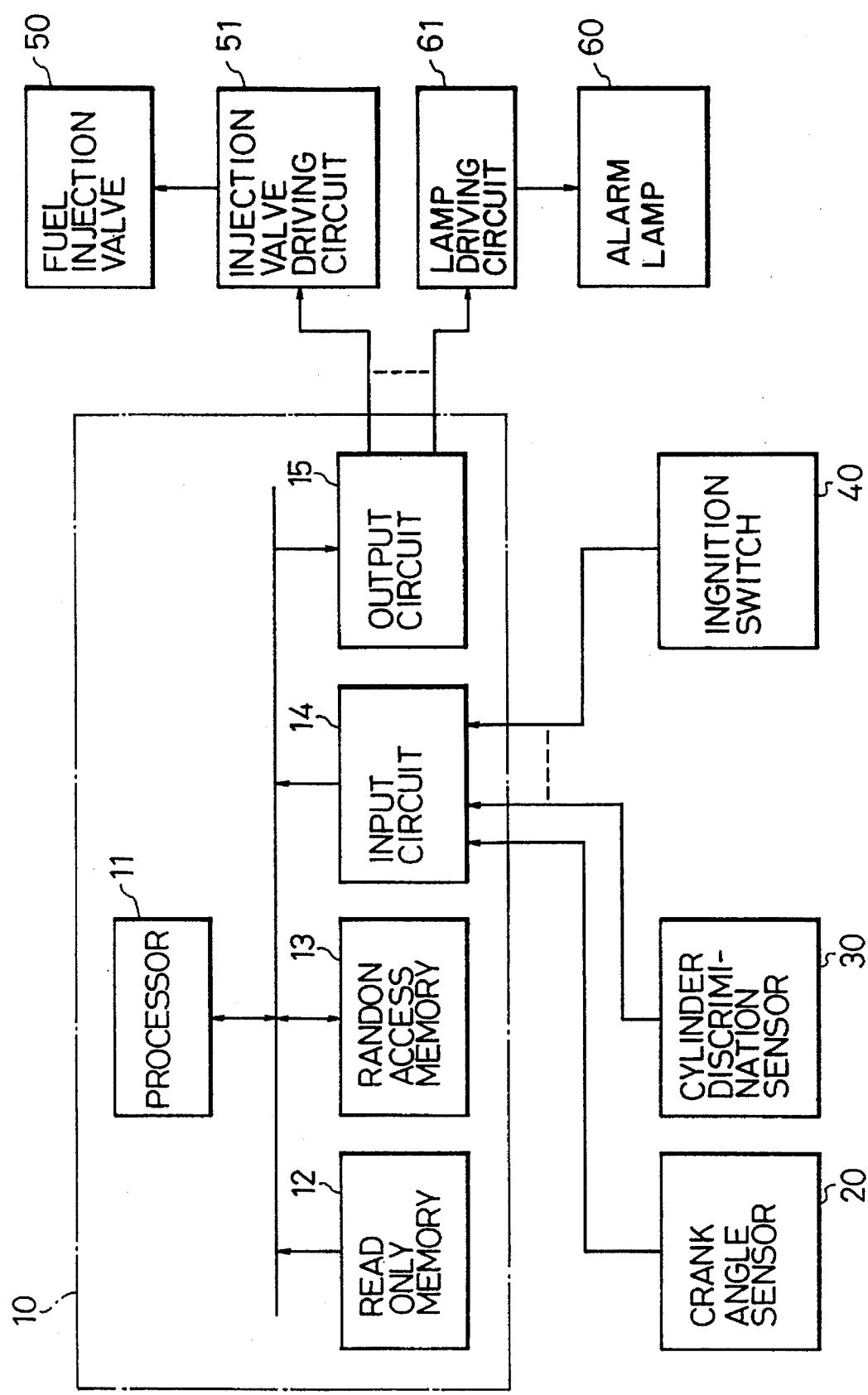
FIG. 7 is an schematic block diagram showing a apparatus for embodying a misfire detection method according to a first embodiment of the present invention.

An apparatus for embodying the misfire detection method of this embodiment is adapted to be mounted on a multi-cylinder internal combustion engine, for example a 6-cylinder engine (not shown). As shown in FIG. 7, the misfire detection apparatus comprises, as primary elements, a controller 10, a crank angle sensor 20, and cylinder discrimination sensor 30.

Figure 8:
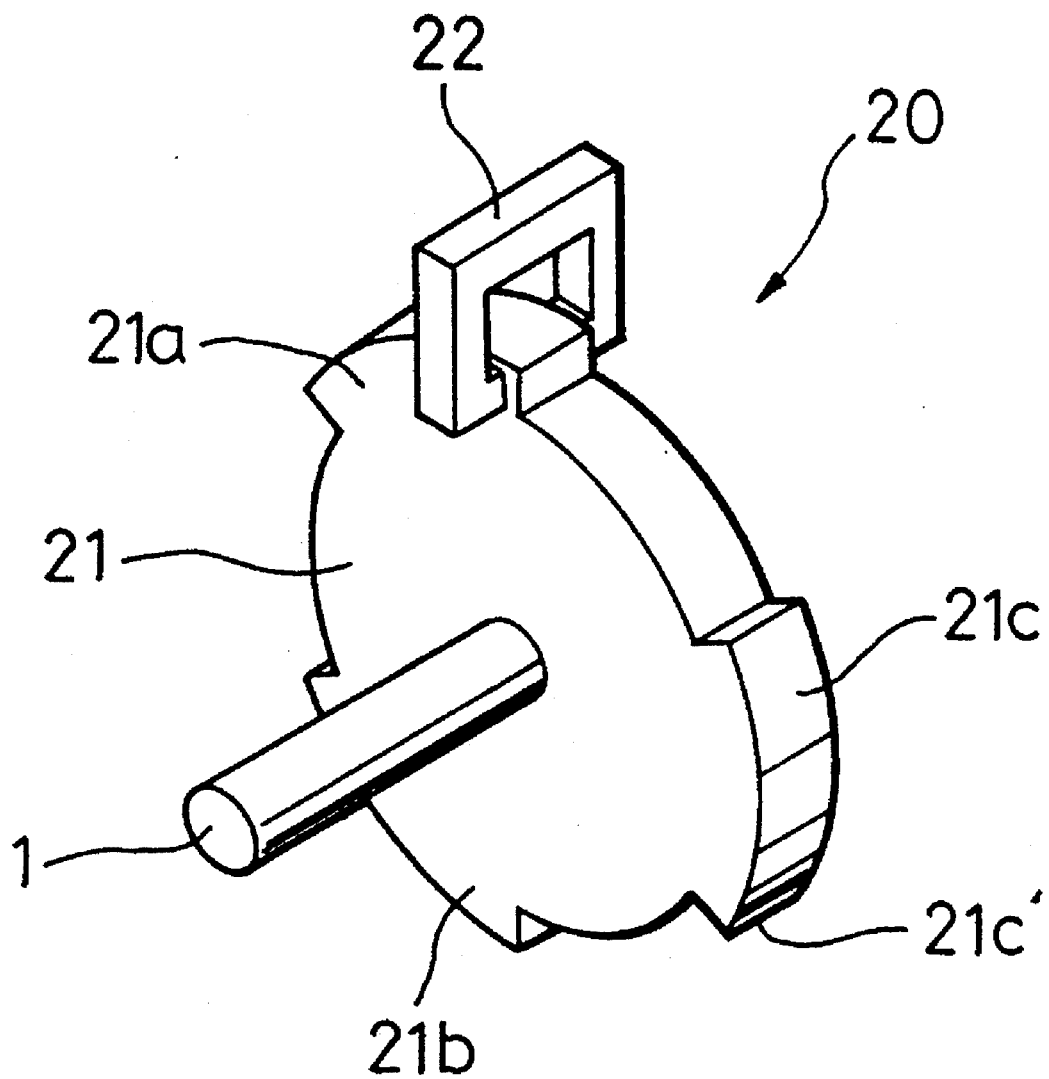
FIG. 8 is a schematic perspective view of a crank angle sensor in the apparatus shown in FIG. 7.

Referring to FIG. 8, the crank angle sensor 20 comprises a rotary member (rotor) 21 disposed for rotation in unison with a crankshaft 1 of the engine and formed at its periphery with first, second and third vanes 21a, 21b and 21c protruding in the crankshaft radial direction, and a detecting portion 22 disposed on a stationary member (not shown) on the engine side so as to face the rotary member 21, so that the crank angle sensor 20 generates a pulse output when the passage of the vane 21a, 21b or 21c is optically or electromagnetically detected by the detecting portion 22. The first to third vane 21a, 21b and 21c, each having a circumferential length corresponding to a predetermined rotation angle of the crankshaft, are disposed spacedly in the circumferential direction at predetermined angular intervals. Therefore, the angular interval between the corresponding ends of the adjacent vanes is 120 degrees. Actually, however, because of an error in the construction of the crank angle sensor, particularly errors in manufacturing and installing the vanes 21a, 21b, and 21c, the angular interval between the ends of adjacent vanes is not always 120 degrees exactly. Usually, there is an error of angular interval of about 1 degree or less.

The cylinder discrimination sensor 30 is mounted to a camshaft (not shown) for rotation in unison therewith, so that pulse output is generated each time the camshaft passes a particular rotational position corresponding to a particular stroke phase (e.g., piston upper dead center position) in a predetermined cylinder, while the crankshaft 1 rotates two turns and the camshaft rotates one turn.

The controller 10, which functions as a main element of the misfire detection apparatus and performs various ordinary engine control operations, has a processor 11 for executing various control programs, a read only memory 12 for storing the control programs, and a random access memory 13 for temporary data storage. The processor 11 is connected, via an input circuit 14, to various sensors and switches (partially not shown) such as the crank angle sensor 20, the cylinder discrimination sensor 30, an ignition switch 40, a suction air amount sensor, a suction air temperature sensor, and a water temperature sensor. It is also connected, via an output circuit 15, to various driving circuits (only the circuits corresponding to elements 50 and 60 are shown by reference numerals 51 and 61) for driving various actuators, including a fuel injection valve 50, and for driving an alarm lamp 60, etc.

With the apparatus of this embodiment mounted on a 6-cylinder engine in which firing operation is performed in the order of cylinder number, when the end (front end 21c' or rear end) of the third vane 21c, for instance, passes through the detecting portion 22, the crankshaft enters a first crankshaft rotation angle region corresponding to either one of the first and fourth cylinders (preferably the explosion stroke mainly in the one cylinder), which cylinders belong to a first cylinder group, and when the end of the first vane 21a passes through the detecting portion 22, the crankshaft leaves the first rotation angle region. The corresponding front or rear ends of the first and third vane are disposed at rotor angular positions which define the first crankshaft rotation angle region. In other words, a detection element which consists of one of the vanes and an associated one of vane-not-formed portions of the rotor 21 (here, a combination of the third vane 21c and a vane-not-formed rotor portion on the downstream side of the vane in the direction of rotor rotation, or a combination of this vane-not-formed rotor portion and the first vane 21a) is disposed in a predetermined angle region of the rotor 21 (here, this region corresponds to the first crankshaft rotation angle region). More generally, the detection element consists of at least one vane, or at least one vane-not-formed portion, or a combination thereof.

Likewise, when the end of the first vane 21a passes through the detecting portion 22, the crankshaft enters a second crankshaft rotation angle region corresponding to either one of the second and fifth cylinders, which belong to a second cylinder group, and when the end of the second vane 21b passes through the detecting portion 22, the crankshaft leaves the second rotation angle region. Further, when the end of the second vane 21b passes through the detecting portion 22, the crankshaft enters a third crankshaft rotation angle region corresponding to either one of the third and sixth cylinders, which belong to a third cylinder group, and when the end of the third vane 21c passes through the detecting portion 22, the crankshaft leaves the third rotation angle region.

The discrimination between the first and fourth cylinders, the discrimination between the second and fifth cylinders, and the discrimination between the third and sixth cylinders are performed on the basis of the output of the cylinder discrimination sensor 30.

In the following, the conceptual operation of the misfire detection apparatus will be explained.

During operation of the engine, a time interval from the time point of entering each crankshaft rotation angle region corresponding to an associated one cylinder of the engine to the time point of leaving the angle region is sequentially detected by the crank angle sensor. Also, a parameter value, indicative of angular velocity or angular acceleration of the crankshaft in the crankshaft rotation angle region corresponding to each cylinder is calculated on the basis of a corresponding one of the time intervals sequentially detected.

Further, a deviation of the thus calculated parameter value corresponding to a cylinder checked for misfire (particular cylinder) from a parameter value is calculated. The latter parameter value is calculated based on that time interval which is detected in a detection cycle preceding a detection cycle associated with the cylinder checked for misfire by a number of cycles which varies in dependence on the number of the cylinders provided in the engine, the latter parameter value corresponding to a cylinder belonging to a cylinder group to which the cylinder checked for misfire belongs, or corresponding to the cylinder checked for misfire.

That is, both the two parameter values for the deviation calculation may relate to the cylinder checked for misfire. In this case, preferably, the latest parameter value and the before-latest parameter value, among parameter values detected in sequence in association with the cylinder checked for misfire, are employed for the deviation calculation. The before-latest parameter value is detected in a detection cycle preceding a detection cycle associated with the latest parameter value by the number of cycles (i.e., the number of strokes of the engine which is 2 for a 4-cylinder engine, and 3 for a 6-cylinder engine) determined in accordance with the number of the cylinders provided in the engine. More generally, the aforementioned number of cycles is equal to a multiple of 2 for a 4-cylinder engine, and is equal to a multiple of 3 for a 6-cylinder engine.

More preferably, in order to perform the deviation calculation based on newer information, a parameter value associated with the cylinder checked for misfire is employed together with a parameter value associated with a cylinder belonging to the cylinder group to which the cylinder checked for misfire relates. A cylinder group consists of two cylinders in which a firing operation is to be carried out alternately while the crankshaft makes two revolutions in an in-line type 4-cylinder engine wherein the firing operation is performed in the order of the first, second, third and fourth cylinders, the first and fourth cylinders-form a cylinder group, and the second and third cylinders form another cylinder group. In a V-type 6-cylinder engine wherein the firing-operation is performed in the order of first through sixth cylinders, the first and fourth cylinders form a cylinder group, the second and fifth cylinders form another cylinder group, and the third and sixth cylinders form a still another cylinder group.

Figure 1:
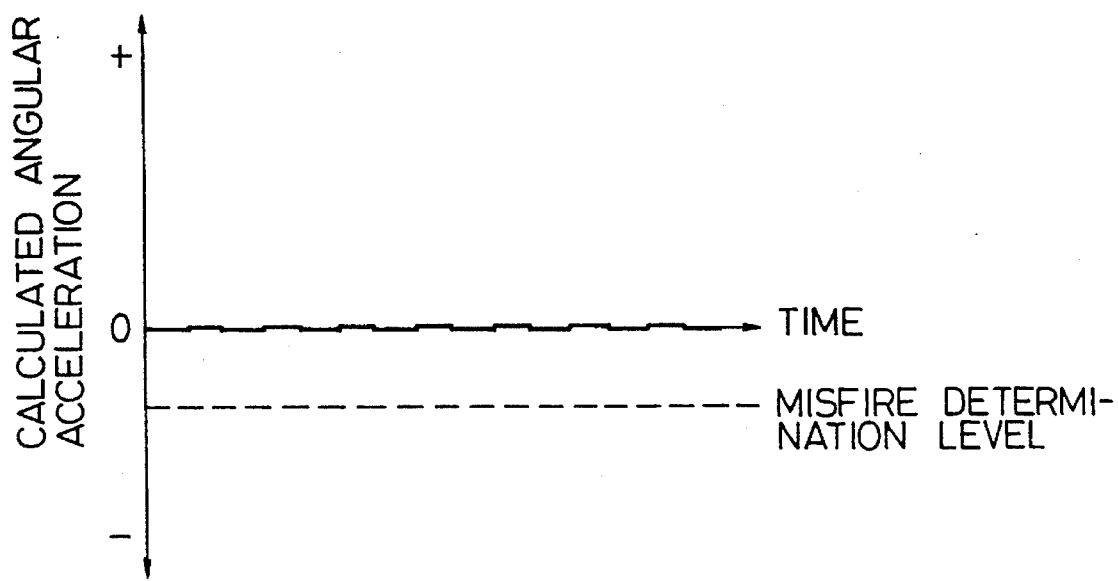
FIG. 1 is a graph showing, by way of example, a time-based change of the crankshaft rotational acceleration calculated on the basis of time intervals detected when a 2-cylinder engine is operated at a constant speed by use of a crank angle sensor free from vane errors.
Figure 2:
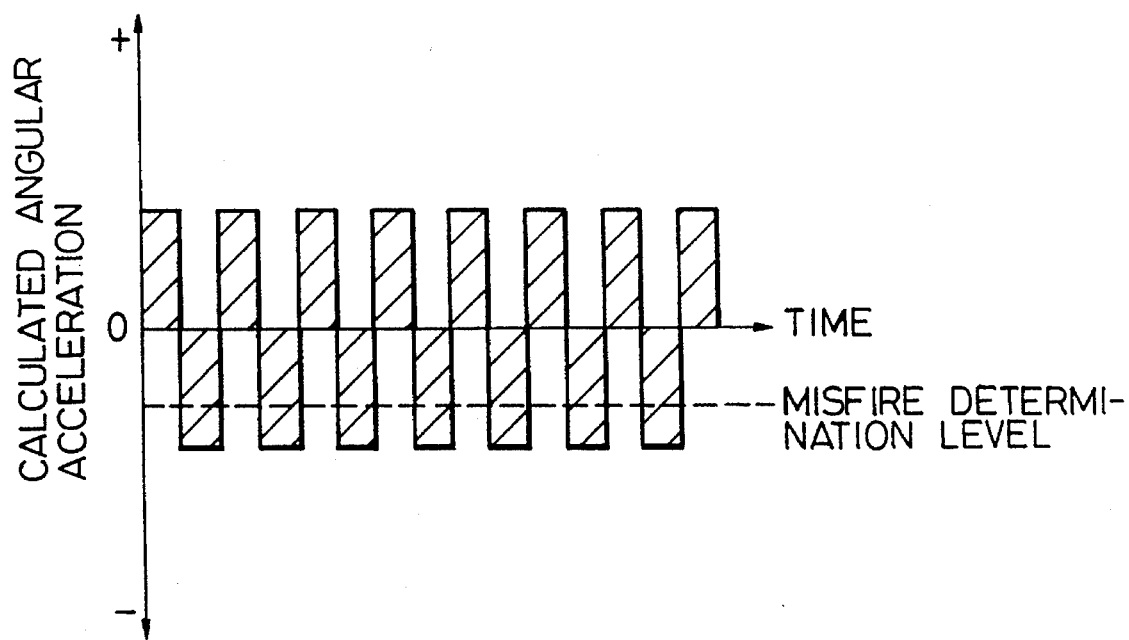
FIG. 2 is a graph similar to FIG. 1 and showing, by way of example, a time-based change of the crankshaft rotational acceleration calculated on the basis of time intervals detected by use of a crank angle sensor entailing vane errors.
Figure 3:
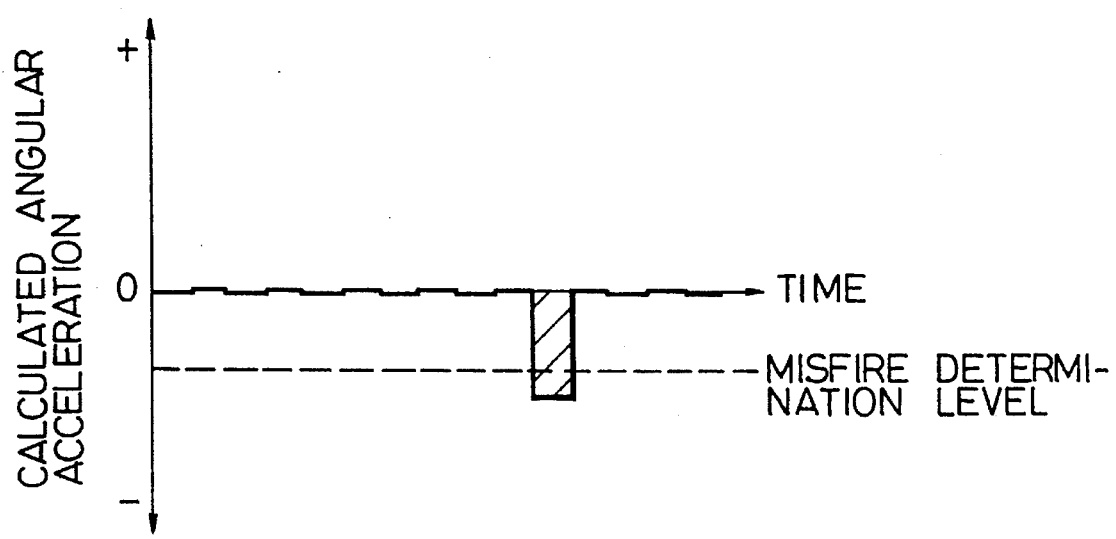
FIG. 3 is a graph showing, by way of example, a time-based change of the angular acceleration calculated on the basis of time intervals detected by a crank angle sensor free from vane errors, upon occurrence of misfire and before and after the misfire occurrence.
Figure 4:
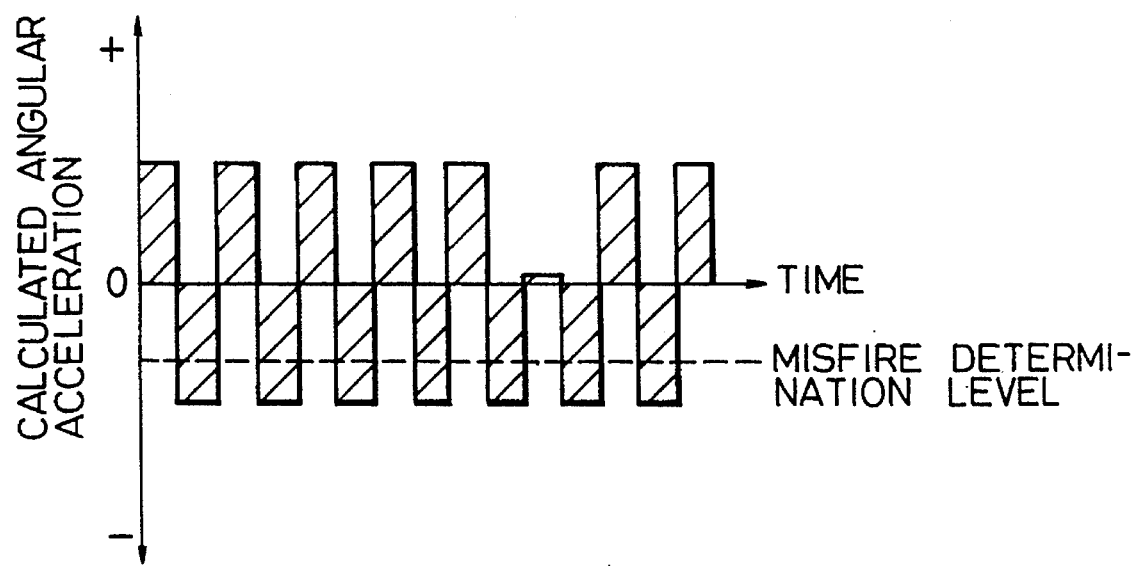
FIG. 4 is a graph similar to FIG. 3 and showing, by way of example, a time-based change of the angular acceleration calculated on the basis of time intervals detected by a crank angle sensor entailing vane errors.
Figure 5:
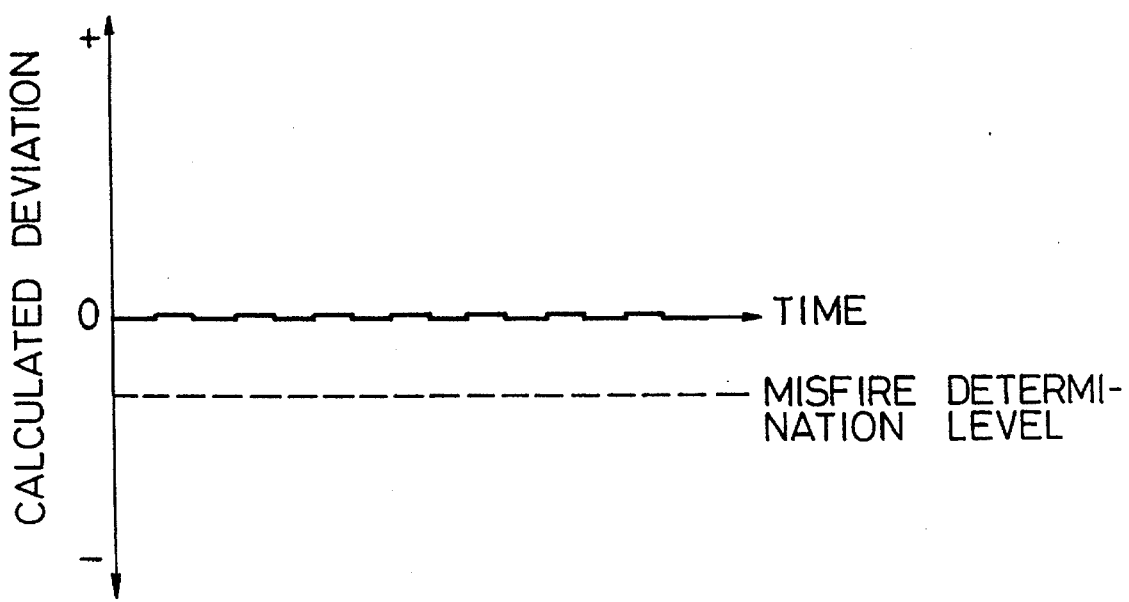
FIG. 5 is a graph for showing that a fluctuation in the angular acceleration shown in FIG. 2 can be eliminated by the application of a misfire detection method according to the present invention.
Figure 6:
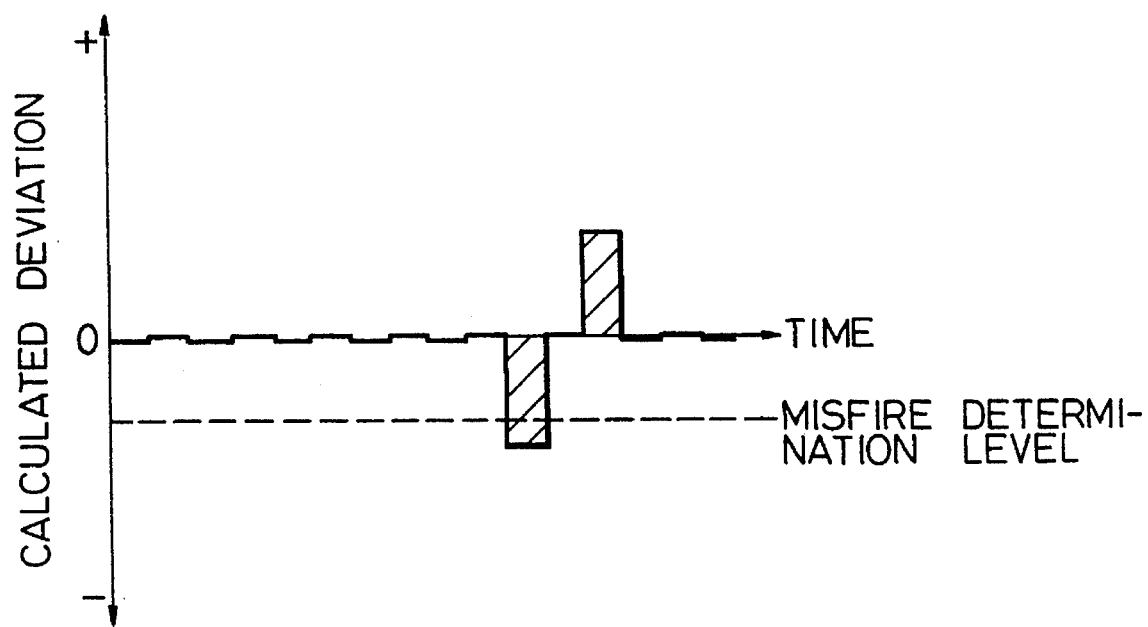
FIG. 6 is a graph for showing that a misfire detection unable state shown in FIG. 4 can be eliminated by the application of a misfire detection method of the present invention.

Both of two parameter values respectively associated with the cylinder checked for misfire, or both of a parameter value associated with the cylinder checked for misfire and a parameter value associated with a cylinder which belongs to a cylinder group to which the cylinder checked for misfire belongs are calculated on the basis of time intervals detected through the use of the same vane of the crank angle sensor. For this reason, if a deviation between these parameter values is determined, then an error of the vane which is common to the parameter values is canceled. As a consequence, even in the case of using a crank angle sensor having vanes which would otherwise cause a fluctuation in the calculated angular acceleration as shown in FIG. 2, there occurs no fluctuation in the deviation between the two parameter values (e.g., two angular acceleration values), provided that the engine is operated at a constant speed (see, FIG. 5), while permitting an occurrence of misfire being detected if misfire occurs (see, FIG. 6). In other words, a detection error, attributable to an error in the construction of the crank angle sensor, is eliminated.

Next, the deviation between the parameter values is compared with a determination value. When the deviation is less than the determination value, then an occurrence of misfire in the cylinder checked for misfire is detected. Thus, an occurrence/absence of misfire can be detected accurately, even if a crank angle sensor having vanes which entail manufacturing and installing errors is used.

In the following, a more concrete explanation regarding the operation of the misfire detection apparatus will be given.

Figure 9:
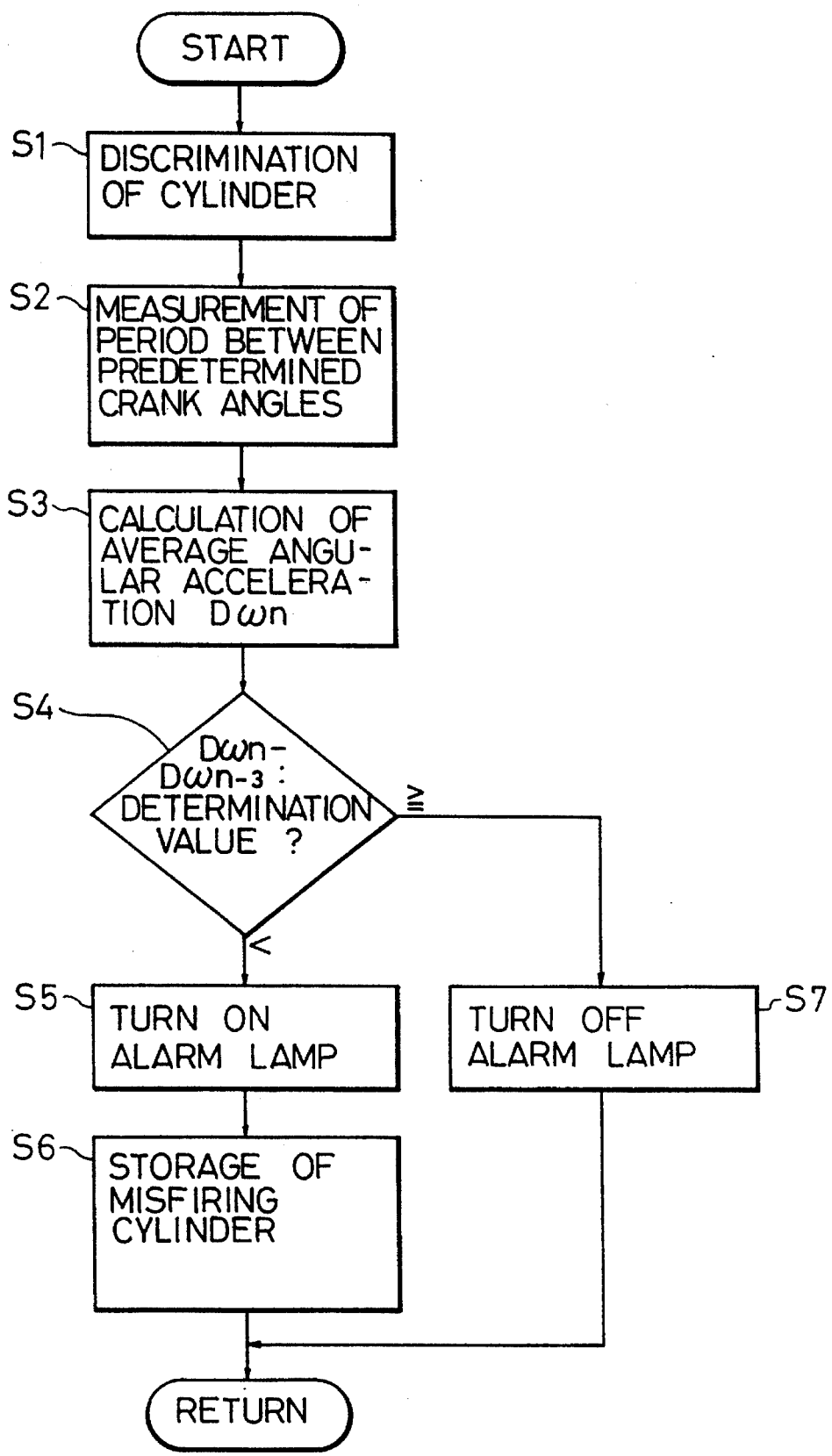
FIG. 9 is a flowchart showing a misfire detection process executed by a controller shown in FIG. 7.

During the engine operation, the processor 11 periodically repeats a misfire detection process shown in FIG. 9 while sequentially receiving the pulse output from the crank angle sensor 20 and the pulse output from the cylinder discrimination sensor 30.

The processor 11 starts the misfire detection process cycle each time it receives the pulse output from the crank angle sensor 20. At each detection cycle, the processor 11 first determines the order or sequential number of the pulse output of crank angle sensor among the pulse outputs of the crank angle sensor sequentially received after receiving the pulse output from the cylinder discrimination sensor 30. Thus, the sequential number of the cylinder (i.e., the cylinder number) corresponding to the received pulse output of crank angle sensor is discriminated (Step S1). Preferably, the cylinder which is executing an explosion stroke (output stroke) at the present time is discriminated as the discriminated cylinder.

When the processor 11 decides the entering into the crankshaft rotation angle region corresponding to the discriminated cylinder group m (m is 1, 2, or 3) according to the receipt of the pulse output of crank angle sensor 20, it restarts a period measuring timer (not shown). The discriminated cylinder group m includes the cylinder discriminated in Step S1.

When receiving the next pulse output from the crank angle sensor 20, the processor 11 decides the leaving from the crankshaft rotation angle region corresponding to the discriminated cylinder group m, stops the time counting operation of the period measuring timer, and reads the result of time counting (Step S2). This result of time counting represents the time interval $T_{m(n)}$ from the time of entering into the crankshaft rotation angle region corresponding to the discriminated cylinder group m to the time of leaving from that region, that is, the period $T_{m(n)}$ which is defined by two predetermined crank angles corresponding to the discriminated cylinder group. Here, the subscript n in the period $T_{m(n)}$ indicates that the concerned period corresponds to the n-th firing operation in the discriminated cylinder. In a 6-cylinder engine, the period $T_{m(n)}$ is the period between 120-degree crank angles in the determined cylinder group. More generally, it is the period between (720/N) degree crank angles in an N-cylinder engine.

The above pulse output representing the leaving from the crankshaft rotation angle region corresponding to the discriminated cylinder in the present cycle also represents the entering into the crankshaft rotation angle region corresponding to the next discriminated cylinder. Therefore, the cylinder determining step S1 for the next discriminated cylinder is executed according to this pulse output, and the period measuring timer is restarted to start the period measurement for the next discriminated cylinder.

Next, from the period $T_n(=T_{m(n)})$ between 120-degree crank angles measured in Step S2 of the present detection cycle, the processor 11 calculates the average angular velocity $\omega_n(=120 \text{ degree}/T_n)$ of the crankshaft at this period. Then, the processor reads the average angular velocity $\omega_{n-1}$ which is measured in the previous detection cycle and stored in the memory 13. Further, the processor 11 calculates the average angular acceleration $D\,\omega_n$ of crankshaft at the period between 120-degree crank angles of the present detection cycle from the equation $D\,\omega=(\omega_n-\omega_{n-1})\div\{(1/2)\cdot(T_n+T_{n-1})\}$ using the measured values $T_n$, $T_{n-1}$, and the calculated values $\omega_n$, $\omega_{n-1}$ (Step S3). Here, the symbol D is a differential operator symbol denoting d/dt.

In order to detect an occurrence/absence of misfire in the discriminated cylinder, the processor 11 calculates a deviation of the average angular acceleration $D\,\omega_n$, calculated in Step S3 and associated with the cylinder checked for misfire from that $D\,\omega_{n-3}$, associated with the cylinder belonging to the cylinder group to which the cylinder checked for misfire belongs. Further, the processor 11 compares the thus calculated deviation with a determination value to thereby determine a magnitude relation therebetween (Step S4). The determination value is set to a negative value. The value $D\,\omega_{n-3}$ is calculated by using the time interval $T_{n-3}$ and the like, the time interval $T_{n-3}$ being detected in the detection cycle preceding the detection cycle, in which the time interval $T_n$ as the basis for the calculation of the value $D\,\omega_n$ is calculated, by three cycles or strokes (i.e., by one crankshaft revolution).

If it is decided at the step S4 that the calculated deviation ($D\,\omega_n - D\,\omega_{n-3}$) is smaller than the determination value, the processor 11 sends a drive signal of, for example, H level to a lamp driving circuit 61 to turn on an alarm lamp 60, to thereby tell that misfire has occurred in the discriminated cylinder (Step S5). Further, the occurrence of misfire in the discriminated cylinder determined in Step S1 is stored in the memory 13 (Step S6). If it is decided at Step S4 that the calculated deviation is equal to or greater than the determination value, the processor 11 sends a drive signal of, for example, L level to turn off the alarm lamp 60, to tell that misfire has not occurred in the discriminated cylinder (Step S7). The above-described misfire detection based on the deviation of the average angular acceleration associated with the cylinder checked for misfire from that associated with the cylinder which cooperates with the cylinder checked for misfire to form the same cylinder group is exact without being affected by vane angle interval errors for the reasons mentioned above.

After completion of the misfiring cylinder storing step S6 or the alarm lamp turning-off step S7, the processor 11 waits until the next pulse output from the crank angle sensor 20 is received. Upon the receipt of pulse output, the processor 11 restarts the process shown in FIG. 9.

In the following, a misfire detection method according to a second embodiment of the present invention will be explained.

As compared with the method of the first embodiment, the method of this embodiment is characterized in that the time interval (measured period) detected by the crank angle sensor is corrected with use of a correction factor for compensating structural errors of the sensor, and the misfire detection is carried out based on the crankshaft angular acceleration which is obtained from the thus corrected time interval. Meanwhile, the method of this embodiment can be embodied by using the apparatus shown in FIG. 7; therefore, an explanation of the apparatus will be omitted.

First, the outline of the misfire detection method according to the present embodiment will be explained.

Based on corresponding ones of time intervals detected in sequence, a correction factor for compensating structural errors of the crank angle sensor is sequentially calculated. This correction factor reflects errors in manufacturing and installing vanes. Thus, by correcting the detected time interval with use of the correction factor, it is possible to eliminate the vane errors.

Further, the calculation of correction factor is repeatedly carried out, so that the correction factor is renewed one after another. In other words, the learning of correction factor is performed. In case that the learning of correction factor must be started from the beginning for any reasons such as replacement of a battery mounted on a vehicle, a certain time will be required to obtain an appropriate correction factor which permits elimination of vane errors.

Thus, in the present embodiment, the misfire detection is carried out based on the deviation between the parameter values (crankshaft angular acceleration values or the like) until a degree of convergence of the repeatedly calculated correction factor reaches a desired one, namely, until the learning of correction factor is completed for the present, to thereby prevent erroneous detection caused by utilization of an inappropriate correction factor. Thereafter, when the convergence degree of correction factor reaches a desired one, each detected time interval is corrected with use of the correction factor corresponding thereto, and the misfire detection is carried out base on the thus corrected time interval.

This misfire detection mode is excellent in a follow-up characteristic relative to changes of the operating condition of an engine, since it utilizes the correction factor which immediately reflects the sequentially detected time interval, or newer information detected, as compared with the aforementioned misfire detection mode utilizing a parameter value corresponding to a detection cycle preceding the time interval detection cycle associated with the cylinder checked for misfire.

In the following, more detailed explanations as to the misfire detection method of the present embodiment will be given.

Figure 10:
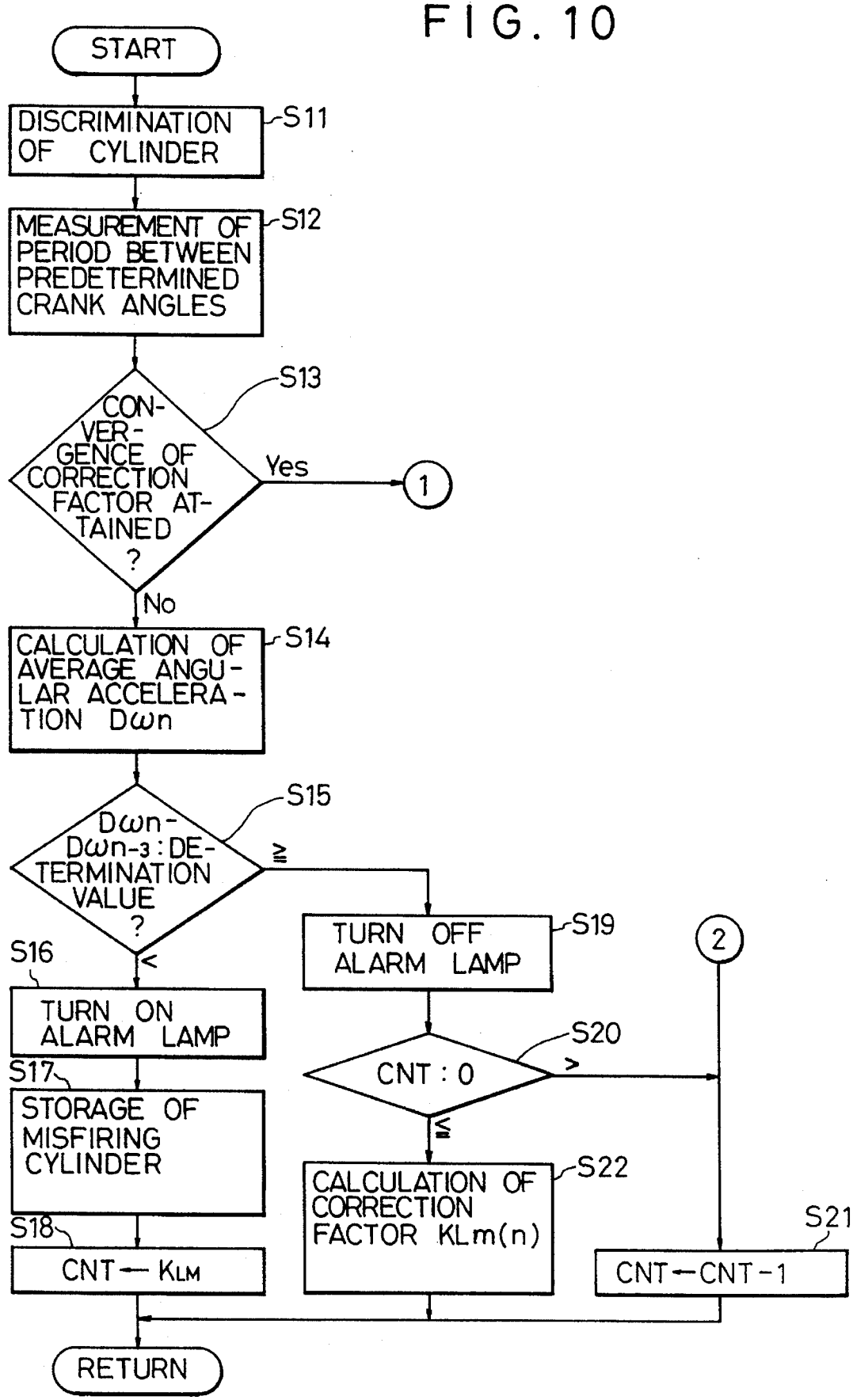
FIG. 10 is a flowchart showing part of misfire detection process in a misfire detection method according to a second embodiment of the present invention.
Figure 11:
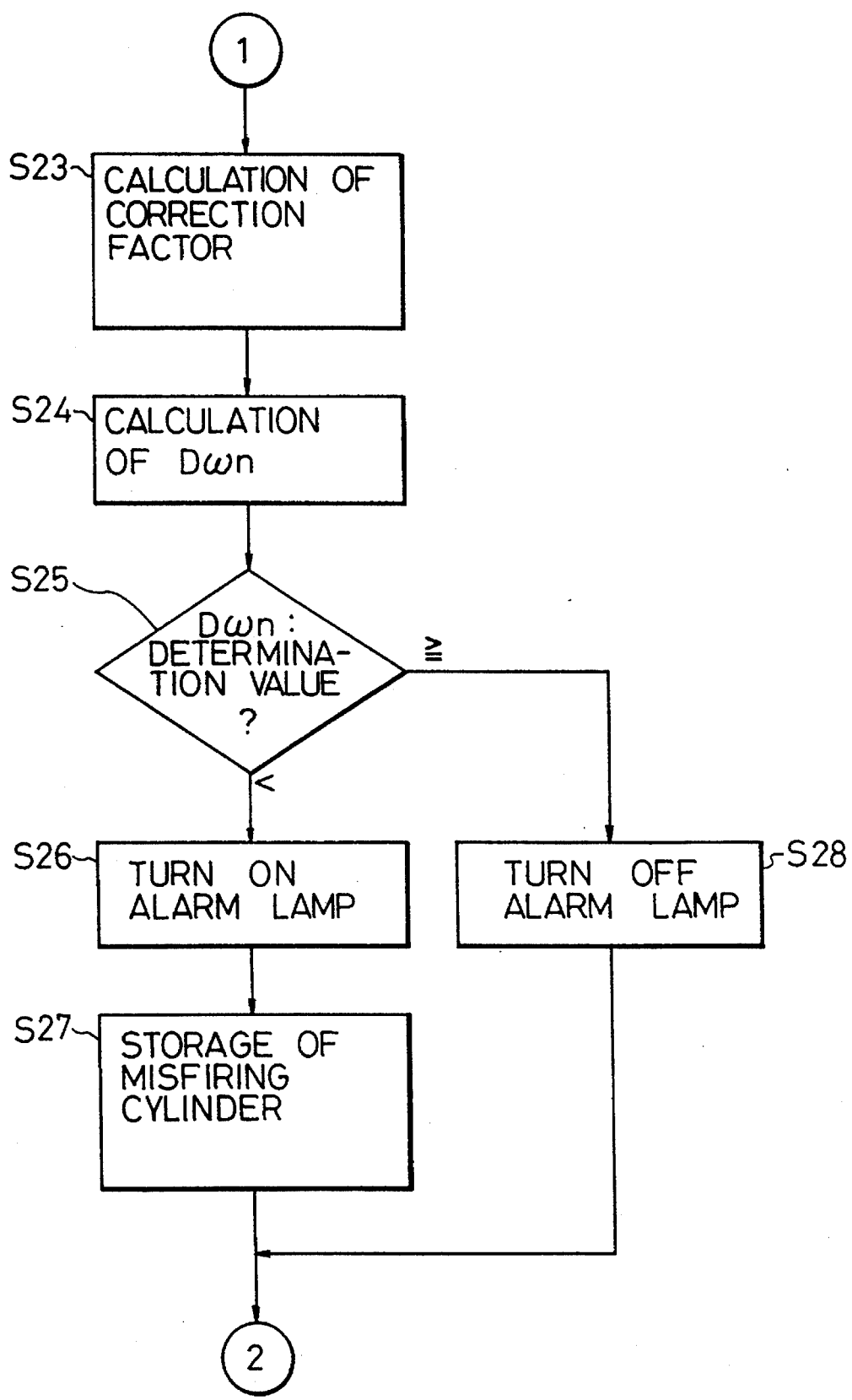
FIG. 11 is a flowchart showing the remaining part of the misfire detection process which is partly shown in FIG. 10.

Referring to FIGS. 10 and 11, in each misfire detection process repeatedly executed, the processor 11 sequentially executes the discrimination of cylinder and the measurement of period between predetermined crank angles in Steps S11 and S12 respectively corresponding to Steps S1 and S2 in FIG. 9. Next, the processor 11 decides whether or not a determination condition, indicating that a degree of convergence of the correction factor, ordinarily calculated in each detection cycle as mentioned-later, reaches a desired one, is fulfilled (Step S13).

In order to make this decision, the processor 11 determines whether a predetermined time period has elapsed (or a predetermined number of strokes have been carried out) from the time point of engine start; or determines whether a deviation between the maximum value and the minimum value among correction factor values calculated in sequence from the moment when a stroke preceding the present stroke by a predetermined number of strokes is carried out to the moment when the present stroke is carried out (or a standard deviation of the thus calculated correction factor values) is equal to or smaller than a predetermined value; or determines whether a number of execution times of correction factor calculation is greater than a predetermined number of times. Meanwhile, the decision at Step S13 may be carried out by making arbitrary two or more types of determinations among the aforementioned five types of determinations.

If a result of the decision at Step S13 is negative, the processor 11 determines that the convergence degree of correction factor has not reached a desired one as yet, and hence it is inappropriate to carry out the misfire detection based on the crankshaft angular acceleration calculated by using the correction factor. In this case, the processor 11 calculates the average angular acceleration D $\omega_n$ at Step S14 which corresponds to Step S3 of FIG. 9. Next, at Step S15 corresponding to Step S4, the processor 11 calculates a deviation between the average angular acceleration D $\omega_n$ associated with the cylinder checked for misfire and that D $\omega_{n-3}$ associated with the cylinder which cooperates with the cylinder checked for misfire to form the same cylinder group, and compares the thus calculated deviation with a determination value, to determine a magnitude relation therebetween.

If the calculated deviation is smaller than the determination value, then the processor 11 turns on the alarm lamp and stores the misfiring cylinder at Steps S16 and S17 respectively corresponding to Steps S5 and S6, and sets a number $K_{LM}$ of strokes, for which the calculation of correction factor is to be prohibited, in a counter CNT (Step S18). On the other hand, if it is determined at Step S15 that the deviation (D $\omega_n$–D $\omega_{n-3}$) is equal to or greater than the determination value, the processor 11 turns off the alarm lamp at Step S19 corresponding to Step S7 of FIG. 9, and then compares the counter value CNT with a value of "0" to thereby determine a magnitude relation therebetween (Step S20). If the counter value CNT is greater than the value of "0," the processor 11 determines that the correction factor calculation is prohibited, and decrements the counter value CNT by a value of "1" (Step S21).

When it is determined at Step S20 that the counter value CNT is equal to or smaller than the value of "0," the processor 11 determines that the prohibition of correction factor calculation is canceled, and calculates the correction factor $K_{Lm(n)}$ relating to the discriminated cylinder group m, to eliminate the period measurement error due to variations in the vane angle intervals caused in manufacturing and installing the vanes (Step S22).

For the calculation of the correction factor $K_{Lm(n)}$ at Step S22, the equation $K_{Lm(n)} = a \cdot L_{Lm(n-1)} + (1-a) \cdot K_{Lm}$ is used, wherein symbol "a" is a filter constant, as a weighting factor, which is stored beforehand in the memory 12, and which takes a value not less than "0" and not more than "1." Symbol $K_{Lm(n-1)}$ denotes the correction factor relating to the discriminated cylinder group m which is calculated in the previous detection cycle and stored in the memory 13. Symbol $K_{Lm}$ denotes a value calculated from the equation $K_{Lm} = T_{m(n)} \div (T_{(n)}/3)$. Here, symbol $T_{m(n)}$ denotes the period between 120-degree crank angles detected this time for the discriminated cylinder group m, as mentioned above. Further, symbol $T_{(n)}$ denotes the sum of the periods between 120-degree crank angles of the first to third cylinder groups successively measured in the previous two cycles and in the present detection cycle, that is, the period between 360-degree crank angles ($T_{(n)} = T_{1(n)} + T_{2(n)} + T_{3(n)}$). If the engine speed is constant, the value of the period between 360-degree crank angles divided by the value of "3," $T_{(n)}/3$, is equal to the exact period between 120-degree crank angles in the case where there is no error in the vane angle interval. Therefore, the calculated value $K_{Lm}$ indicates the ratio of the period between 120-degree crank angles for the discriminated cylinder group m to the exact period between 120-degree crank angles.

After completion of the process at Step S18 or S21 or S22, the processor 11 waits until the next pulse output from the crank angle sensor 20 is received. Upon the receipt of pulse output, the processor 11 restarts the process shown in FIGS. 10 and 11.

At Step S13 in a subsequent detection cycle, if it is determined that: a predetermined time period has elapsed (or a predetermined number of strokes have been carried out) from the time point of engine start; or a deviation between the maximum value and the minimum value, among correction factor values calculated in sequence from the moment when a stroke preceding the present stroke by a predetermined number of strokes is carried out to the moment when the present stroke is carried out (or a standard deviation of the thus calculated correction factor values) is equal to or smaller than a predetermined value; or a number of execution times of correction factor calculation is greater than a predetermined number of times, then the processor 11 determines that the convergence degree of the correction factor sequentially calculated has reached a desired one. In this case, the processor 11 calculates, at Step S23, the correction factor $K_{Lm(n)}$ in a similar manner as in the case of Step S22, and then calculates, at Step S24, the average angular acceleration D $\omega_n$ in a similar manner as in the case of Step S14.

In Step S24, the processor 11 calculates the average angular acceleration D $\omega_n$ in a similar manner as in the case of Step S3 shown in FIG. 9. That is, the processor 11 calculates the average angular acceleration D $\omega_n$ of crankshaft at the period between 120-degree crank angles in the present detection cycle in accordance with the equation D $\omega_n = K_{Lm(n)} \cdot (\omega_n - \omega_{n-1}) \div \{(1/2) \cdot (T_n + T_{n-1})\}$, which is different from the calculation equation employed in Step S14, with use of the correction factor $K_{Lm(n)}$ calculated at Step S23, in addition to the period $T_n$ between 120-degree crank angles of the present cycle, that $T_{n-1}$ of the preceding cycle, the average angular velocity of the present cycle, and that $\omega_{n-1}$ of the preceding cycle. Thus, the angular acceleration of crankshaft is determined on the basis of the measurement period corrected by using the correction factor $K_{Lm(n)}$.

Next, in order to detect an occurrence/absence of misfire in the discriminated cylinder (cylinder checked for misfire), the processor 11 compares the average angular acceleration D $\omega_n$, calculated at Step S24 and indicative of fluctuation of crankshaft rotation, with the determination value stored beforehand in the memory 12 (Step S25), to thereby determine a magnitude relation therebetween. Meanwhile, the determination value is set to a negative value.

If it is determined that the calculated value D $\omega_n$ is smaller than the determination value, the processor 11 performs the alarm lamp turning-on and the misfiring cylinder storage (Steps S26 and S27) in a similar manner as in the case of Steps S16 and S17. On the other hand, if it is determined at Step S25 that the average angular acceleration D $\omega_n$ of crankshaft is equal to or greater than the determination value, the alarm lamp turning-off is carried out, at Step S28, in a similar manner as in the case of Step S19. The aforementioned misfire detection based on the corrected period is accurate since the detection is free from the bad effect of vane angle interval errors.

After completion of the misfiring cylinder storing step S27 or the alarm lamp turning-off step S28, the processor 11 waits for supply of the next pulse output from the crank angle sensor 20, and restarts the misfire detection process shown in FIGS. 10 and 11 upon receipt of pulse output.

The present invention is not limited to the foregoing first and second embodiments, and various modifications thereof may be made.

For example, although the case where the present invention is applied to a 6-cylinder engine has been explained in the above embodiments, the present invention can be applied to various types of engines including a 4-cylinder engine.

In the case of a 4-cylinder engine, the number of vanes installed to the crank angle sensor shown in FIG. 9 is set to "2," and the angular interval between the corresponding ends of these two vanes is set to 180 degrees. Further, in Step S3 shown in FIG. 9 and Step S15 shown in FIG. 10, the deviation (D $\omega_n$ – D $\omega_{n-2}$) between average angular acceleration values is employed in place of the deviation (D $\omega_n$ – $\omega_{n-3}$).

Moreover, if the correction factor $K_{Lm}$ is employed in association with a 4-cylinder engine, then the correction factor calculation may be made, at Step S22 and S23, in accordance with the equation $K_{Lm} = T'_{m(n)} \div (T'_{(n)}/2)$. Symbol $T'_{m(n)}$ represents the period between 180-degree crank angles detected this time for the discriminated cylinder group m, and symbol $T'_{(n)}$ denotes the sum of the periods between 180-degree crank angles of the first and second cylinder groups successively measured in the preceding and present detection cycles, that is, the period between 360-degree crank angles ($T'_{(n)} = T_{1(n)} + T_{2(n)}$).

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A misfire detection method for determining an occurrence/absence of misfire in an engine having a plurality of cylinders based on pieces of rotational information of a rotor which is disposed for rotation in synchronism with a crankshaft of the engine, the pieces of rotational information of the rotor being detected by use of a plurality of detection elements to be detected which are mounted to the rotor at angular intervals, comprising the steps of:

(a) repeatedly detecting rotational acceleration information of the crankshaft in a time period between predetermined crank angles, corresponding to at least one particular cylinder among the plurality of cylinders, by use of only at least one particular detection element, among the plurality of detection elements, which is disposed in a predetermined rotational angle region of the rotor;

(b) sequentially outputting results of the repeated detection;

(c) performing first misfire determination for determining an occurrence/absence of misfire in the at least one particular cylinder based on the thus sequentially output results of the repeated detection, (g) repeatedly calculating a correction factor for compensating a structural error of the at least one particular detection element based on a corresponding one or ones of the pieces of rotational information of the rotor, to thereby carry out learning of the correction factor;

(h) detecting a corresponding one or ones of pieces of crankshaft rotational information in time periods between crank angles, respectively corresponding to the plurality of cylinders, by use of a corresponding one or ones, including the at least one particular detection element, of the plurality of detection elements after said step (g) is completed; and (i) performing second misfire determination for determining an occurrence/absence of misfire in the at least one particular cylinder based on the correction factor and the corresponding one or ones of the pieces of crankshaft rotational information.

2. The misfire detection method according to claim 1, wherein said step (a) includes the sub-steps of:

(a1) repeatedly detecting a time interval required for the at least one particular detection element to pass through a predetermined rotational position; and (a2) repeatedly detecting crankshaft rotational acceleration information associated with the at least one particular cylinder based on the repeatedly detected time intervals.

3. The misfire detection method according to claim 1, wherein the crankshaft rotational acceleration information associated with the at least one particular cylinder is crankshaft rotational angular acceleration associated therewith.

4. The misfire detection method according to claim 1, wherein said step (a) includes the sub-step of:

(a3) determining an occurrence of misfire in the at least one particular cylinder when crankshaft rotational acceleration information corresponding to a lately output detection result among the results of detection sequentially output is smaller, by a predetermined amount or more, than crankshaft rotational acceleration information corresponding to an earlier output detection result.

5. The misfire detection method according to claim 1, wherein the at least one particular cylinder consists of at least two cylinders receiving pistons which are simultaneously positioned at upper dead center positions.

6. The misfire detection method according to claim 5, including the step (d) of discriminating a predetermined cylinder among the plurality of cylinders by use of a cylinder discrimination means;

wherein a cylinder in which misfire occurs among the at least two cylinders as the at least one particular cylinder is identified based on a result of the discrimination performed by the cylinder discrimination means when it is determined that misfire occurs in the at least one particular cylinder.

7. The misfire detection method according to claim 1, including the steps of:

(e) repeatedly detecting crankshaft rotational acceleration information in a time period between crank angles, corresponding to each of cylinder groups, by use of only at least one detection element which is disposed in a rotor rotational angle region corresponding to each cylinder group, the cylinder groups each consisting of cylinders, which receive pistons simultaneously positioned at upper dead center positions, among the plurality of cylinders; and (f) determining an occurrence/absence of misfire in each cylinder group based on pieces of the crankshaft rotational acceleration information repeatedly detected.

8. The misfire detection method according to claim 1, wherein pieces of crankshaft rotational information in time periods between predetermined crank angles for the plurality of cylinders are detected in sequence, and results of the sequential detection are output; and wherein the second misfire determination is performed based on at least two of the results of the sequential detection.

9. The misfire detection method according to claim 1, wherein a determination is made that the learning of the correction factor is completed when a predetermined time period has elapsed from a moment at which the engine is started.

10. The misfire detection method according to claim 1, wherein a determination is made that the learning of the correction factor is completed when a predetermined number of strokes has been carried out in the engine from a moment at which the engine is started.

11. The misfire detection method according to claim 1, wherein a determination is made that the learning of the correction factor is completed when the correction factor, obtained by repeated calculation of the correction factor over a predetermined time period, has a value falling within a predetermined range.

12. The misfire detection method according to claim 1, wherein a determination is made that the learning of the correction factor is completed when a standard deviation of the correction factor, obtained by repeated calculation of the correction factor over a predetermined time period, becomes smaller than a predetermined value.

13. The misfire detection method according to claim 1, wherein a determination is made that the learning of the correction factor is completed when the calculation of the correction factor is repeated a number of times which is greater than a predetermined value.

14. The misfire detection method according to claim 1, wherein the corresponding one or ones of the pieces of crankshaft rotational information for the second misfire determination are rotational angular acceleration of the crankshaft associated therewith.

15. The misfire detection method according to claim 1, wherein the corresponding one or ones of the pieces of crankshaft rotational information are corrected by the correction factor, and the second misfire determination is carried out based on the thus corrected crankshaft rotational information.

16. The misfire detection method according to claim 1, wherein a time interval required for the at least one particular detection element to pass through a predetermined rotational position; and wherein the correction factor is repeatedly calculated based on the thus repeatedly detected time interval and a rotation period of the crankshaft.

17. The misfire detection method according to claim 16, wherein a last correction factor is calculated in accordance with an equation as follows and the correction factor is renewed to the thus calculated last correction factor to thereby perform the learning of the correction factor:

$$K_{Lm(n)} = a \cdot K_{Lm(n-1)} + (1-a) \cdot K_{Lm}$$

with $$K_{Lm} = T_{m(n)} / (T_{(n)}/A)$$

where $T_{m(n)}$ indicates a lastly detected time interval; A, a number of the detection elements mounted to the rotor; $T_{(n)}$, a latest rotation period of the crankshaft; $K_{Lm(n-1)}$, a precedently calculated correction factor; and a $(0 \leq a \leq 1)$, a weighting factor.

18. A misfire detection method for determining an occurrence/absence of misfire in an engine having a plurality of cylinders based on pieces of rotational information of a rotor which is disposed for rotation in synchronism with a crankshaft of the engine, the pieces of rotational information of the rotor being detected by use of a plurality of detection elements to be detected which are mounted to the rotor at angular intervals, comprising the steps of:

(a) repeatedly calculating a correction factor for compensating a structural error of the plurality of detection elements based on a corresponding one or ones of the pieces of rotational information of the rotor, to thereby carry out learning of the correction factor;

(b) determining whether or not the learning is completed;

(c) repeatedly detecting rotational acceleration information of the crankshaft in a time period between predetermined crank angles, corresponding to at least one particular cylinder among the plurality of cylinders, by use of only at least one particular detection element, among the plurality of detection elements, which is disposed in a predetermined rotational angle region of the rotor, when a determination is made in said step (b) that the learning is not completed;

(d) sequentially outputting results of the repeated detection; and (e) performing first misfire determination for determining an occurrence/absence of misfire in the at least one particular cylinder based on the thus sequentially output results of the repeated detection;

(f) detecting a corresponding one or ones of pieces of crankshaft rotational information in time periods between crank angles, respectively corresponding to the plurality of cylinders, by use of a corresponding one or ones, including the at least one particular detection element, of the plurality of detection elements, when a determination is made in said step (b) that the learning is completed; and (g) performing second misfire determination for determining an occurrence/absence of misfire in the at least one particular cylinder based on the correction factor and the corresponding one or ones of the pieces of crankshaft rotational information, in place of the first misfire determination.

19. The misfire detection method according to claim 18, wherein the at least one particular cylinder consists of at least two cylinders receiving pistons which are simultaneously positioned at upper dead center positions.

20. The misfire detection method according to claim 18, including the steps of:

(h) repeatedly detecting crankshaft rotational acceleration information in a time period between crank angles, corresponding to each of cylinder groups, by use of only at least one detection element which is disposed in a rotor rotational angle region corresponding to each cylinder group, the cylinder groups each consisting of cylinders, which receive pistons simultaneously positioned at upper dead center positions, among the plurality of cylinders; and (i) determining an occurrence/absence of misfire in each cylinder group based on pieces of the crankshaft rotational acceleration information repeatedly detected.

* * * * *